United States Patent
Rudelic

(10) Patent No.: US 8,001,385 B2
(45) Date of Patent: Aug. 16, 2011

(54) METHOD AND APPARATUS FOR FLASH UPDATES WITH SECURE FLASH

(75) Inventor: John C. Rudelic, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 1296 days.

(21) Appl. No.: 11/472,028

(22) Filed: Jun. 21, 2006

(65) Prior Publication Data

US 2007/0300068 A1 Dec. 27, 2007

(51) Int. Cl.
*G06F 21/00* (2006.01)
*G06F 11/30* (2006.01)
*H04L 9/28* (2006.01)

(52) U.S. Cl. .................... 713/176; 713/193; 726/27
(58) Field of Classification Search ............... None
See application file for complete search history.

(56) References Cited

U.S. PATENT DOCUMENTS

| | | | | |
|---|---|---|---|---|
| 5,875,248 A * | 2/1999 | Lewis | | 713/168 |
| 5,935,242 A * | 8/1999 | Madany et al. | | 713/1 |
| 5,964,873 A * | 10/1999 | Choi | | 713/2 |
| 6,009,524 A * | 12/1999 | Olarig et al. | | 726/10 |
| 6,085,334 A * | 7/2000 | Giles et al. | | 714/7 |
| 6,918,017 B1 * | 7/2005 | Lemke | | 711/154 |
| 7,103,617 B2 * | 9/2006 | Phatak | | 1/1 |
| 7,323,996 B2 * | 1/2008 | Mullins | | 340/572.7 |
| 7,383,431 B2 * | 6/2008 | Takamizawa et al. | | 713/2 |
| 7,665,081 B1 * | 2/2010 | Pavlyushchik | | 717/168 |
| 7,685,189 B2 * | 3/2010 | Mittal et al. | | 707/686 |
| 7,698,698 B2 * | 4/2010 | Skan | | 717/168 |
| 7,801,867 B2 * | 9/2010 | Mittal et al. | | 707/686 |
| 2002/0065978 A1 * | 5/2002 | Mattison | | 711/1 |
| 2003/0037246 A1 * | 2/2003 | Goodman et al. | | 713/191 |
| 2004/0039872 A1 * | 2/2004 | Takamizawa et al. | | 711/103 |
| 2004/0186861 A1 * | 9/2004 | Phatak | | 707/200 |
| 2005/0021968 A1 * | 1/2005 | Zimmer et al. | | 713/176 |
| 2005/0229171 A1 * | 10/2005 | Henry et al. | | 717/168 |
| 2005/0268341 A1 * | 12/2005 | Ross | | 726/26 |
| 2005/0278399 A1 | 12/2005 | Herle et al. | | |
| 2006/0020821 A1 * | 1/2006 | Waltermann et al. | | 713/189 |
| 2006/0075004 A1 * | 4/2006 | Stakutis et al. | | 707/204 |
| 2007/0198685 A1 * | 8/2007 | Phatak | | 709/223 |
| 2007/0277045 A1 * | 11/2007 | Matsukawa et al. | | 713/189 |
| 2008/0005577 A1 * | 1/2008 | Rager et al. | | 713/183 |
| 2008/0140960 A1 * | 6/2008 | Basler et al. | | 711/162 |
| 2009/0150611 A1 * | 6/2009 | Fortin et al. | | 711/115 |
| 2010/0058314 A1 * | 3/2010 | Wang | | 717/168 |

* cited by examiner

*Primary Examiner* — Christopher A Revak
(74) *Attorney, Agent, or Firm* — Blakely, Sokoloff, Taylor & Zafman LLP

(57) ABSTRACT

Firmware updates are performed in a digital device that includes a secure flash that secures each block of stored data with a digital signature. In at least one embodiment, the update package that is received by the digital device for use in performing the update includes the digital signatures of blocks to be updated in the flash. In other embodiments, the digital signatures are generated within the digital device after an update package has been received.

19 Claims, 4 Drawing Sheets

METHOD AND APPARATUS FOR FLASH UPDATES WITH SECURE FLASH

TECHNICAL FIELD

The invention relates generally to flash memory and, more particularly, to methods and structures for updating flash memories.

BACKGROUND OF THE INVENTION

Flash memory is a form of non-volatile memory that is used within a wide variety of digital devices. For example, flash memories are commonly used within personal computers, cellular telephones, digital cameras, personal digital assistants, MP3 players, and other devices. Flash memories can be used as data storage devices, in place of or supplemental to, for example, hard disks. They may also be used to store program instructions as firmware within a digital device. The basic input output system (BIOS) of a digital system, for example, is usually stored within a flash memory. The BIOS usually consists of a set of software routines that test hardware at startup, start the operating system, and support the transfer of data among hardware devices within a system. Programs stored in flash memories in digital systems commonly need to be updated to, for example, correct software bugs or add new functionality to the systems. As the communication capabilities of digital devices increase, security is becoming a major concern for information stored within flash memories in digital devices. There is a need for techniques and structures that are capable of efficiently updating flash memories within digital devices while also addressing security concerns.

DETAILED DESCRIPTION

Figure 1:
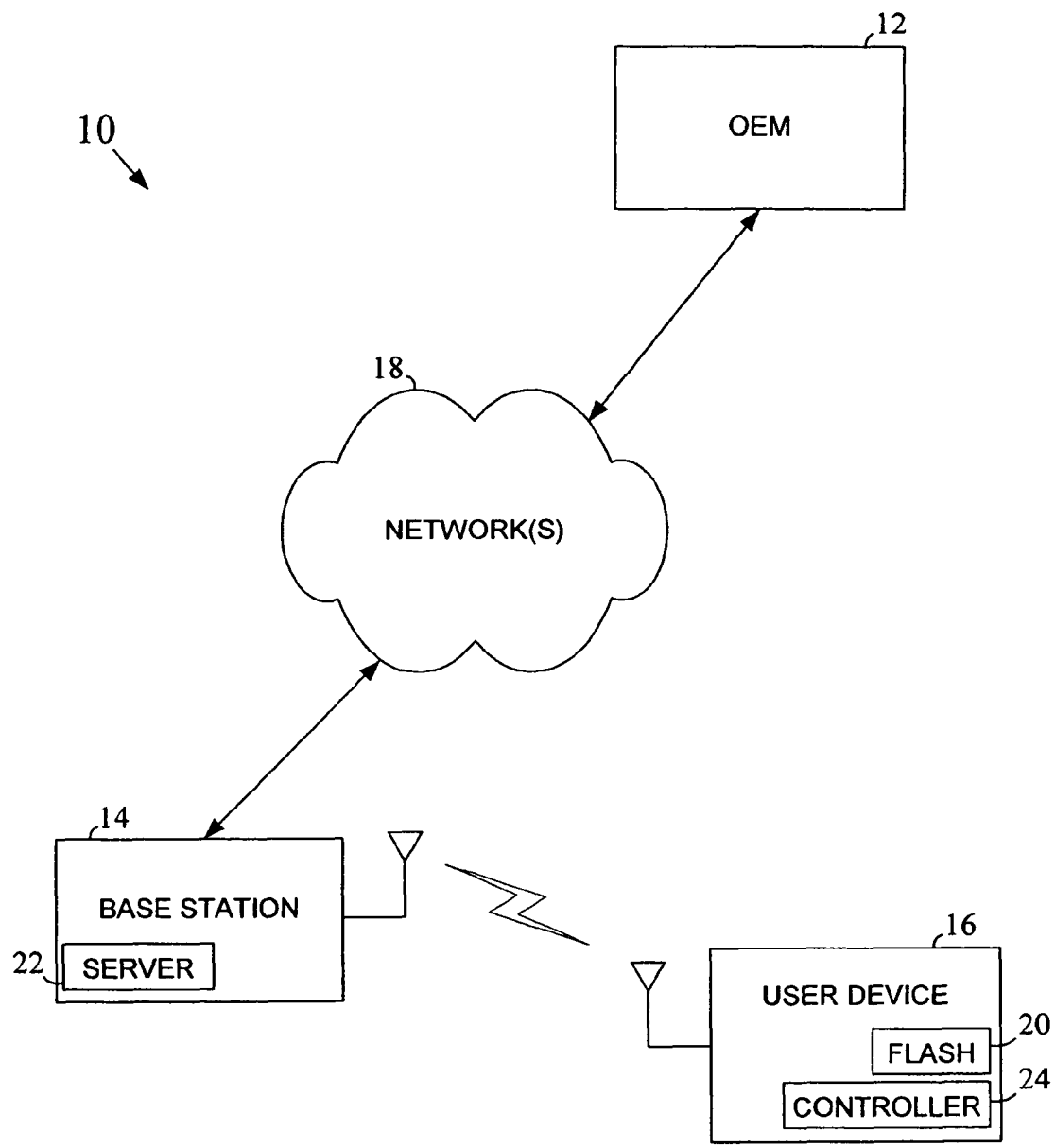
FIG. 1 is a diagram illustrating an example network arrangement that may be used to perform a flash update in accordance with an embodiment of the present invention.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

When performing a firmware update within a digital device, security is a major concern. It is important to know, for example, that the source of the update information is authentic and that the content of the update has not been compromised in transit. It is also important to protect the information stored within the flash memory of the device. Some "secure" flash devices store a digital signature for each block of information within the flash memory. Flash memories are not typically capable of erasing single memory locations or words within the memory. Instead, they are only capable of erasing larger groups of memory locations, known as blocks. The secure flash memories mentioned above store a digital signature for each of these blocks. The digital signatures may later be used by the corresponding device to confirm both the source and the content of the stored information. In this manner, an unauthorized party (e.g., a hacker, a data thief, etc.) will not be able to modify the firmware within a user device without detection. The present invention relates to techniques and structures that may be used to update flash memories within digital devices that utilize such a secure flash approach.

FIG. 1 is a diagram illustrating an example network arrangement 10 that may be used to perform a flash update in accordance with an embodiment of the present invention. As shown, the network arrangement 10 includes: an original equipment manufacturer (OEM) 12, a base station 14, and a user device 16. The OEM 12 is a manufacturer of the user device 16 that may occasionally offer firmware updates for the user device 16 to, for example, fix a bug within the firmware, enhance the capabilities of the device 12, etc. The OEM 12 may communicate update information to the base station 14 associated with the user device 16 via one or more intervening networks 18. The base station 14 may then transfer the update information to the user device 16 for use in updating an internal flash memory 20. In at least one embodiment of the present invention, the firmware update process is based on the firmware over the air (FOTA) update protocol. However, features of the invention may also be used in connection with other firmware update protocols, including protocols for use over wired links.

The user device 16 may be any type of device that is able to communicate over a wireless link. In at least one implementation, the user device 16 is a cellular telephone and the base station 14 is part of a cellular communication network. In other implementations, the user device 16 may include, for example, a computer device having wireless capability, a personal digital assistant (PDA) having wireless capability, an audio and/or video device having wireless capability, a multimedia device having wireless capability, a home appliance having wireless capability, a camera having wireless capability, a video game console having wireless capability, or some other digital device having wireless capability. In such an implementation, the base station 14 may be a wireless AP within a corresponding wireless network (e.g., a home network, a LAN, etc.). The network(s) 18 represents one or more networks through which the OEM 12 communicates with the base station 14. The network(s) 18 may include wireless links, wired links, or a combination of wired and wireless links. The network(s) 18 may include, for example, the Internet, a public switched telephone network (PSTN), a private local area network (LAN), a municipal area network (MAN), a wide area network (WAN), a local multipoint distribution service (LMDS), a multichannel, multipoint distribution service (MMDS), a cellular network, a cable television system, and/or others, including a combination of the above.

As will be appreciated, other network arrangements may alternatively be used. The base station 14 may follow any of a wide variety of different wireless standards, including both wireless networking standards (e.g., IEEE 802.11, IEEE 802.16, HiperLAN 1,2, HomeRF, Ultrawideband, Bluetooth, and/or others) and cellular wireless standards (GSM, GPRS, EDGE, IS-95, cdma 2000, W-CDMA, and/or others).

The user device 16 may include one or more antennas to facilitate the reception and transmission of signals from and to the wireless medium. Any type of antenna(s) may be used including, for example, a dipole, a patch, a helical antenna, an antenna array, and/or others. The user device 16 may also include a controller 24 that may be used to implement firmware update routines and protocols. The controller 24 may be implemented using, for example, one or more digital processing devices. The digital processing device(s) may include, for example, a general purpose microprocessor, a digital signal processor (DSP), a reduced instruction set computer (RISC), a complex instruction set computer (CISC), a field programmable gate array (FPGA), an application specific integrated circuit (ASIC), and/or others, including combinations of the above. Hardware, software, firmware, and hybrid implementations may be used.

In at least one embodiment of the present invention, the flash memory 20 within the user device 16 is a secure flash memory that stores a digital signature for each block of information that is stored therein. This digital signature can be used by the user device 16 to, for example, verify that the information stored within the corresponding block came from a particular source (e.g., OEM 12) and has not been modified since leaving that source. The digital signature associated with a block may be generated in any known manner. In one approach, for example, a digital signature can be generated by performing a hashing function on the corresponding data (e.g., the contents of the block) to generate a hash value that is smaller than the original contents of the block. The hash value may then be encrypted using a private key (e.g., a private key associated with the OEM 12, etc.). The user device 16 may later use a public key associated with the private key to check the individual blocks in the flash memory 20 of the device 16 to determine whether they are authentic.

In at least one embodiment of the invention, the OEM 12 identifies the changes that need to made to the information within the flash memory 20 using a difference file that only includes the differences between the original information and the modified information. This difference file may be delivered to the user device 16 along with instructions that describe how the changes are to be made. The difference file and the accompanying instructions are typically much smaller than the full contents of the flash and thus consume significantly less bandwidth within the networks 18 and the base station 14 during transit. Meta-data may also be communicated to the user device 16 along with the difference file and the instructions. The meta-data may include information such as, for example, OEM name, device model number, source firmware version, target firmware versions, etc.

To perform a firmware update, the OEM 12 may first develop the difference file that will be used. Techniques for generating difference files are known in the art. The OEM 12 may then assemble the difference file into an update package along with the corresponding instructions and the meta-data. The update package may then be digitally signed by the OEM (using a private key of the OEM) and communicated to a server 22 associated with the base station 14. The server 22 may be part of the base station 14 or part of a network that includes the base station 14 (e.g., a server within a cellular network that includes base station 14, etc.). After reception of the update package, the server 22 may check the signature of the update package to verify that it came from the OEM 12.

The server 22 may then deliver the update package to the user device 16 via wireless link. The user device 16 may then check the digital signature of the update package and, if validated, use the package to update the contents of the flash 20. The user device 16 will typically need to know the public key of the OEM to verify the digital signature accompanying the update package.

As described above, in some secure flash memories, each block of information stored within the flash has a corresponding digital signature associated with it. In at least one embodiment of the present invention, the flash updating procedure described above is modified to provide for the creation and storage of these block level digital signatures. In some embodiments of the invention, the digital signatures associated with the blocks in the flash are generated by the entity that creates the update package (e.g., the OEM, a device management entity, etc.). In these embodiments, the update package may include the digital signatures for the blocks that will be modified by the package. In some other embodiments, the digital signatures associated with the blocks in the flash are generated within the user device itself after the update package has been received. Other locations for generating the digital signatures may alternatively be used.

Figure 2:
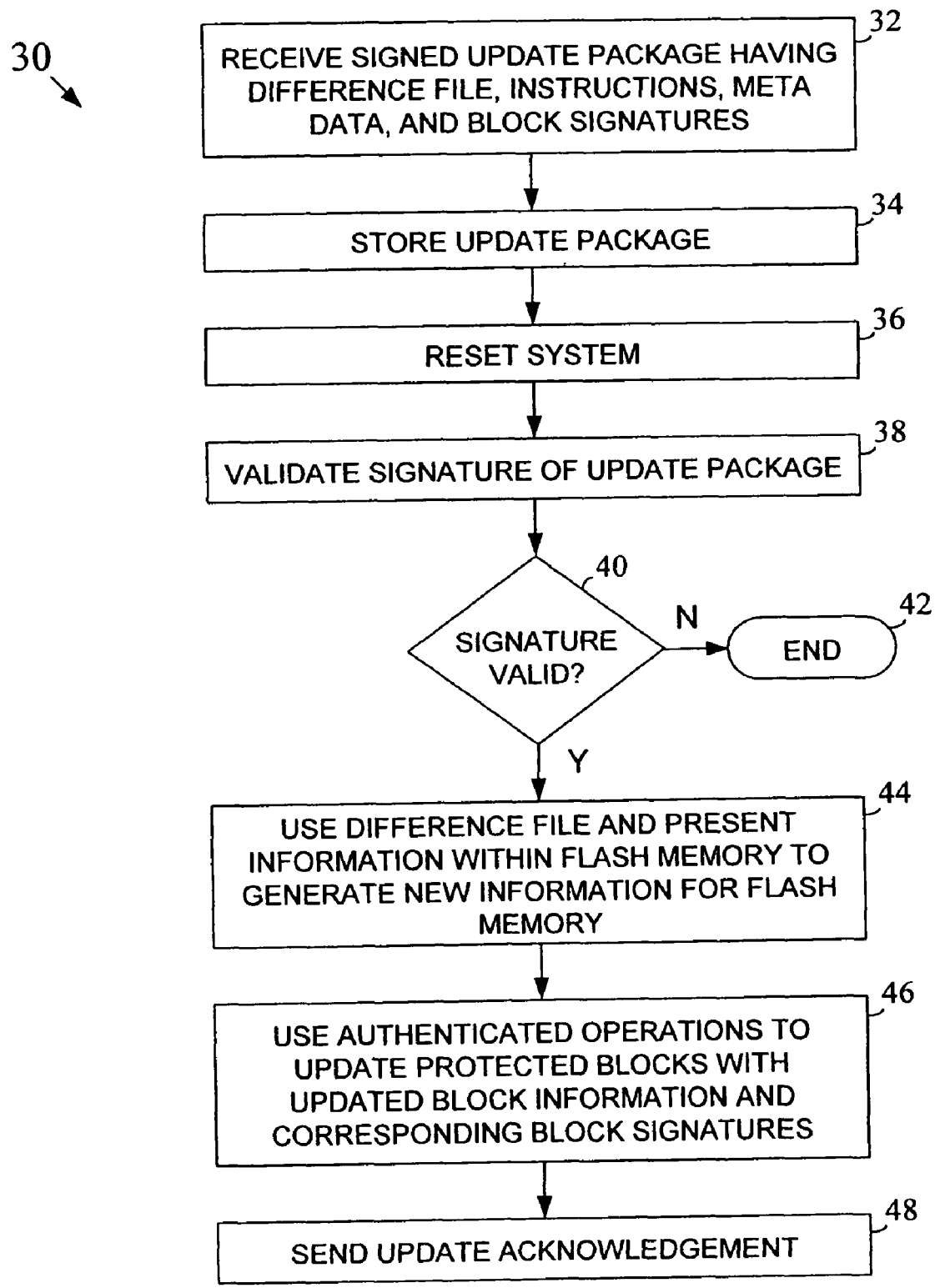
FIG. 2 is a flowchart illustrating a method that may be used to process an update package within a digital user device to update firmware within the device in accordance with an embodiment of the present invention.

FIG. 2 is a flowchart illustrating an example method 30 that may be used to process an update package within a digital user device to update firmware within the device in accordance with an embodiment of the present invention. The method 30 may be implemented within the user device 16 of FIG. 1 (e.g., within controller 24) and/or within other components, devices, and systems having flash memories. As shown in FIG. 2, a signed update package that includes a difference file, instructions for applying the difference file, meta-data, and block signatures for each block of information within the flash to be modified is first received by a digital device (block 32). The package may be received from a wireless or a wired medium. The signed update package is then stored within a non-volatile (nV) memory of the device (block 34). A system reset may then be performed (block 36). During the system reset, the flash memory enters a reset state.

After the reset, the signed update package may be read into the system RAM (random access memory). The present contents of the flash memory may also be read into the RAM. The digital signature appended to the signed update package may then be validated to determine whether the package is authentic (block 38). If the signature is found to be invalid (block 40-N), then the method 30 may be terminated (block 42). A message may then be transmitted to a server (e.g., a device management server) indicating that the digital signature of the update package is invalid. If the digital signature of the update package is valid (block 40-Y), then the difference file is applied to the present contents of the flash memory (within the RAM) to generate the new information to be stored in the flash memory (block 44). Authenticated operations may next be employed to update the protected blocks within the flash memory with the updated block information and the corresponding block level digital signatures (block 46). As described above, the digital signatures of the updated blocks were received as part of the update package. When the update is successfully completed, an update acknowledgement may be sent to an external server indicating that the update was successful (block 48).

At some point in the above-described method, the meta-data of the update package may be checked to determine whether the update package is appropriate for the subject user device. For example, the user device may check the OEM designation, the device model number, the current firmware version, the target firmware versions, etc. within the meta-data to determine whether the update package is intended for this user device. If it is determined that the update package is incorrect for the user device, then method 30 may be terminated and a notification may be sent to the external server indicating that the update package is incorrect.

In the method 30 described above, the update package includes the digital signatures for the flash blocks to be updated. Thus, the entity that created the update package (e.g., the OEM, etc.) has to generate the block signatures beforehand and include them within the package. As described previously, this will typically involve the use of a private key associated with the entity. The corresponding public key associated with the entity will be known within the user device for use in verifying the block signatures, when needed.

Figure 3:
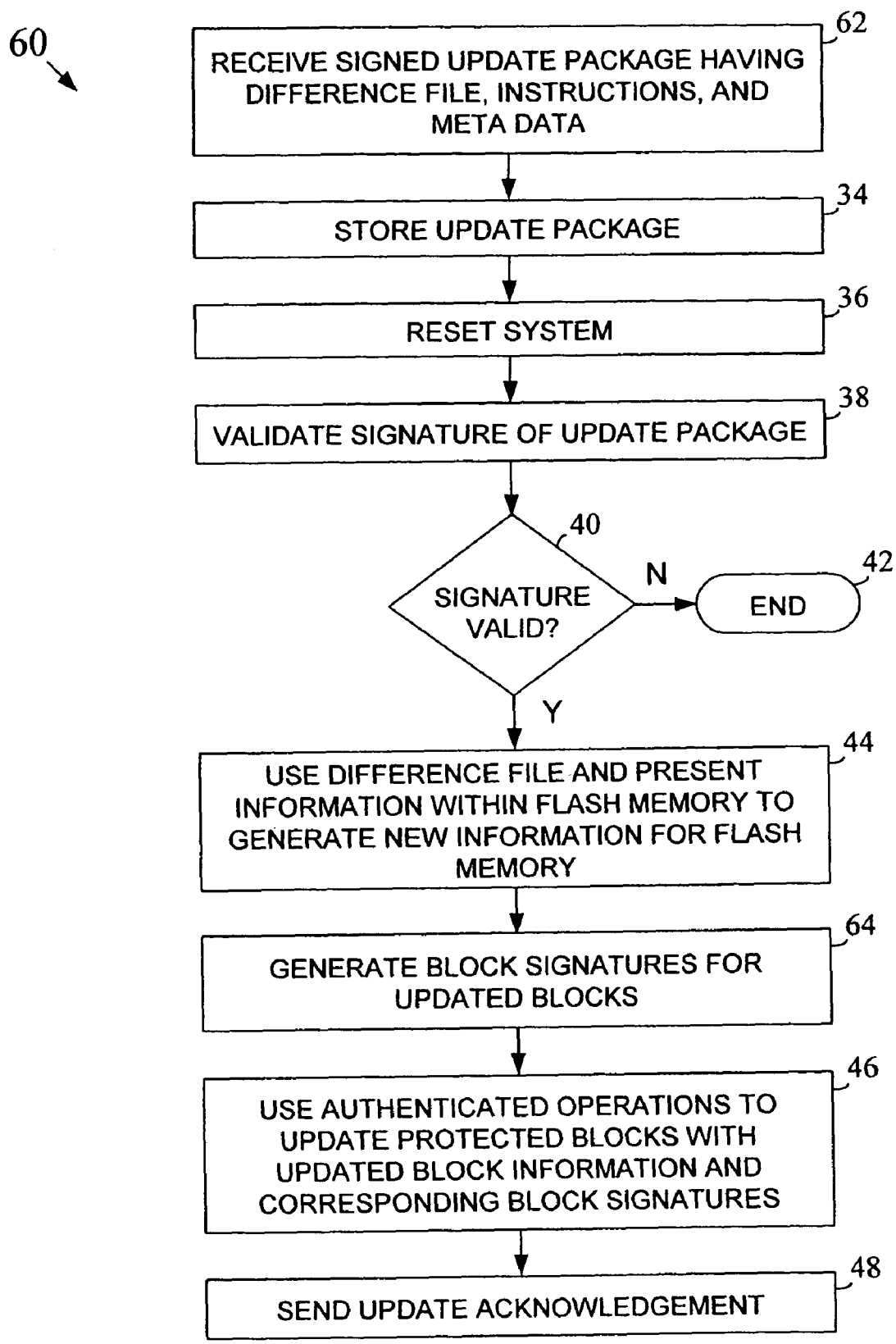
FIG. 3 is a flowchart illustrating another method that may be used to process an update package within a digital user device to update firmware within the device in accordance with an embodiment of the present invention.

FIG. 3 is a flowchart illustrating another example method 60 that may be used to process an update package within a digital user device to update firmware within the device in accordance with an embodiment of the present invention. The method 60 is similar to the method 30 of FIG. 2, except that the block signatures for the updated blocks of the flash memory are not included within the update package. Instead, the block signatures are generated within the user device itself after the new information to be stored within the flash memory has been generated (block 64). Once the block signatures have been generated within the device, the flash memory may be updated as described previously (block 46) and an acknowledgement may be sent (block 48). To generate the block signatures within the user device, the user device can use a locally generated private key (e.g., a private key of the user device itself). If the user device has a locally generated private key, then some means should be provided for protecting this important information from hackers and data thieves. In at least one embodiment of the invention, the private key information is maintained within a trusted platform module (TPM) or other security module within the user device. In at least one embodiment, the TPM may be a part of a controller complex within a digital device. In addition to protecting the private key, the TPM may also be used to generate the digital signatures associated with the blocks that are to be modified.

Figure 4:
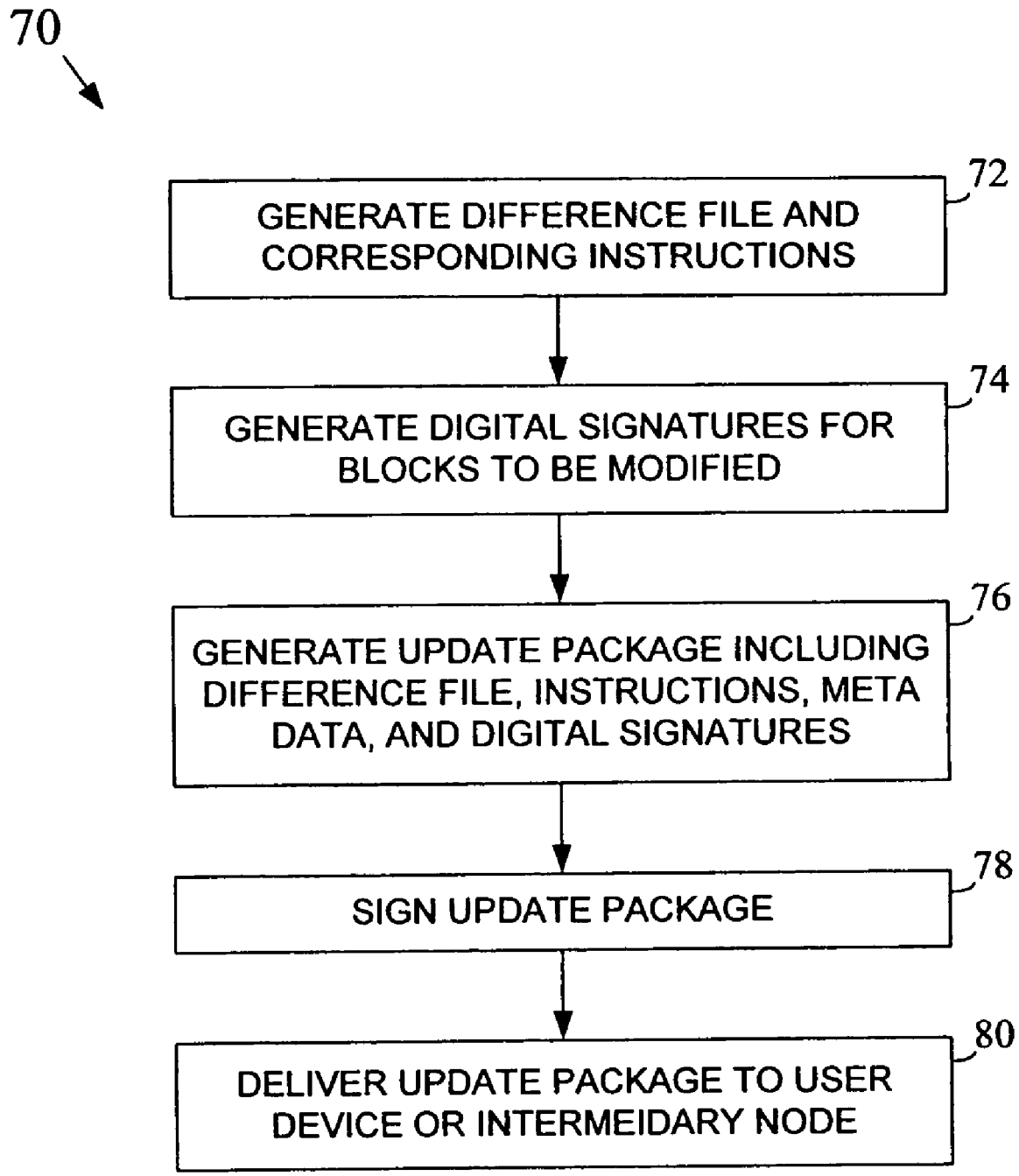
FIG. 4 is a flowchart illustrating a method for use in generating an update package for use by a remote user device to update firmware within the device in accordance with an embodiment of the present invention.

FIG. 4 is a flowchart illustrating an example method 70 for use in generating an update package for use by a user device to update firmware within the device in accordance with an embodiment of the present invention. A difference file is first generated that identifies differences between new information to be stored within a flash memory of the user device and information currently stored within the flash memory (block 72). Instructions may also be generated at this time to describe how to apply the difference file. Digital signatures may next be generated for each of the information blocks within the flash memory that are to be changed (block 74). An update package may then be assembled that includes the difference file, the instructions, the meta-data, and the block signatures (block 76). The update package may then be signed with a digital signature (block 78). The signed update package may then be delivered to a user device of interest or an intermediary node (e.g., server 22, etc.) that will cause the package to be transmitted to the user device (block 80). The update package may be delivered to the user device via a wireless or a wired link.

In the embodiments discussed above, the update package was described as being generated by the OEM that manufactured the user device to be updated. It should be appreciated that other entities may also generate update packages for updating firmware within digital devices and that role is not limited to the OEM. Also, the embodiments described above are primarily concerned with wireless over-the-air (FOTA) type firmware updates. It should be appreciated that features of the invention may also be beneficially implemented within networks that deliver update information to user devices via wired links.

The techniques and structures of the present invention may be implemented in any of a variety of different forms. For example, features of the invention may be embodied within laptop, palmtop, desktop, and tablet computers with or without wireless capability; personal digital assistants (PDAs) with or without wireless capability; cellular telephones and other handheld wireless communicators; pagers; satellite communicators; cameras with or without wireless capability; audio and/or video devices with or without wireless capability; network interface cards (NICs) and other network interface structures; base stations; wireless access points; integrated circuits; as instructions and/or data structures stored on machine readable media; and/or in other formats. Examples of different types of machine readable media that may be used include floppy diskettes, hard disks, optical disks, compact disc read only memories (CD-ROMs), digital video disks (DVDs), Blu-ray disks, magneto-optical disks, read only memories (ROMs), random access memories (RAMs), erasable programmable ROMs (EPROMs), electrically erasable programmable ROMs (EEPROMs), magnetic or optical cards, flash memory, and/or other types of media suitable for storing electronic instructions or data. As used herein, the term "logic" may include, by way of example, software or hardware and/or combinations of software and hardware.

In the foregoing detailed description, various features of the invention are grouped together in one or more individual embodiments for the purpose of streamlining the disclosure. This method of disclosure is not to be interpreted as reflecting an intention that the claimed invention requires more features than are expressly recited in each claim. Rather, as the following claims reflect, inventive aspects may lie in less than all features of each disclosed embodiment.

Although the present invention has been described in conjunction with certain embodiments, it is to be understood that modifications and variations may be resorted to without departing from the spirit and scope of the invention as those skilled in the art readily understand. Such modifications and variations are considered to be within the purview and scope of the invention and the appended claims.

What is claimed is:

1. A method comprising:
receiving an update package in a digital device for use in updating a flash memory within said device, said update package including at least: a difference file identifying changes to be made to the contents of said flash memory, instructions for applying the difference file, and meta-data;
using said difference file and present information within said flash memory to generate updated information for storage in said flash memory;
acquiring a digital signature for each block within said flash memory that is to change when said updated information is stored in said flash memory; and
performing authenticated operations to store said updated information and corresponding digital signatures in said flash memory.

2. The method of claim 1, wherein:
said received update package further includes a digital signature for each block within said flash memory that is to change when said flash memory is updated, wherein acquiring a digital signature includes acquiring said digital signature from said received update package.

3. The method of claim 1, wherein:
acquiring a digital signature includes generating said digital signature within said digital device.

4. The method of claim 3, wherein:
generating said digital signature within said digital device includes, for a first block of said flash memory:
generating a hash value using new information to be stored within said first block of said flash memory; and encrypting said hash value using a private key of a local entity.

5. An apparatus comprising:
a flash memory to store digital information, said digital information to be stored in blocks in said flash memory with each block of information having a corresponding digital signature; and
a controller to control updating of contents of said flash memory, said controller including:
logic to receive an update package from a communication medium for use in updating said contents of said flash memory, said update package including at least: a difference file identifying changes to be made to said contents of said flash memory, instructions for applying said difference file, and meta-data;
logic to generate updated information for storage in said flash memory using said difference file and information presently stored within said flash memory;
logic to acquire a digital signature for each block within said flash memory that is to change when said updated information is stored in said flash memory; and
logic to perform authenticated operations to store said updated information and corresponding digital signatures in said flash memory.

6. The apparatus of claim 5, wherein:
said received update package further includes a digital signature for each block within said flash memory that is to change when said flash memory is updated, wherein said logic for acquiring said digital signature includes logic for obtaining said digital signature from said received update package.

7. The apparatus of claim 5, wherein:
said logic for acquiring said digital signature includes logic for generating said digital signature locally.

8. The apparatus of claim 7, further comprising:
a trusted platform module (TPM) to store a private key of a remote entity that is needed to generate said digital signatures locally.

9. The apparatus of claim 8, wherein:
said TPM is part of said controller.

10. An article comprising a non-transitory storage medium having instructions stored thereon that, when executed by a computing platform, operate to:
receive an update package from a communication medium for use in updating said flash memory, said update package including at least: a difference file identifying changes to be made to the contents of said flash memory, instructions for applying the difference file, and meta-data;
generate updated information for storage in said flash memory using said difference file and information presently stored within said flash memory;
acquire a digital signature for each block within said flash memory that is to change when said updated information is stored in said flash memory; and
perform authenticated operations to store said updated information and corresponding digital signatures in said flash memory.

11. The article of claim 10, wherein:
said received update package further includes a digital signature for each block within said flash memory that is to change when said flash memory is updated, wherein operation to acquire said digital signature includes operation to obtain said digital signature from said received update package.

12. The article of claim 10, wherein:
operation to acquire said digital signature includes operation to generate said digital signature locally.

13. A system comprising:
at least one dipole antenna to receive wireless signals from a wireless transmission medium;
a flash memory to store digital information, said digital information to be stored in blocks in said flash memory with each block of information having a corresponding digital signature; and
a controller to control updating of contents of said flash memory, said controller including:
logic to receive an update package from a communication medium, via said at least one dipole antenna, for use in updating said contents of said flash memory, said update package including at least: a difference file identifying changes to be made to said contents of said flash memory, instructions for applying said difference file, and meta-data;
logic to generate updated information for storage in said flash memory using said difference file and information presently stored within said flash memory;
logic to acquire a digital signature for each block within said flash memory that is to change when said updated information is stored in said flash memory; and
logic to perform authenticated operations to store said updated information and corresponding digital signatures in said flash memory.

14. The system of claim 13, wherein:
said received update package further includes a digital signature for each block within said flash memory that is to change when said flash memory is updated, wherein said logic to acquire said digital signature includes logic for obtaining said digital signature from said received update package.

15. The system of claim 13, wherein:
said logic to acquire said digital signature includes logic for generating said digital signature locally.

16. The system of claim 15, further comprising:
a trusted platform module (TPM) to store a private key that is needed to generate said digital signature locally.

17. A method comprising:
generating a difference file to describe differences between present contents of a flash memory within a digital device and desired, updated contents of said flash memory;
generating digital signatures for blocks of said flash memory that are to be modified using said difference file;
generating an update package that includes said difference file, instructions for applying said difference file, meta-data, and said digital signatures; and
digitally signing said update package.

18. The method of claim 17, further comprising:
delivering said signed update package to a digital device having a flash memory to be updated.

19. The method of claim 17, wherein:
generating digital signatures includes generating a digital signature for a first block of said flash memory to be modified, wherein generating a digital signature for a first block of said flash memory includes:
generating a hash value using new information to be stored within said first block of said flash memory; and
encrypting said hash value using a private key of a local entity.

* * * * *